Jan. 2, 1923.

S. B. KAHNWEILER.
ANIMAL TOY.
FILED DEC. 17, 1921.

1,441,095

WITNESSES

INVENTOR
SIDNEY B. KAHNWEILER
BY
ATTORNEYS

Patented Jan. 2, 1923.

1,441,095

UNITED STATES PATENT OFFICE.

SIDNEY B. KAHNWEILER, OF NEW YORK, N. Y.

ANIMAL TOY.

Application filed December 17, 1921. Serial No. 522,972.

*To all whom it may concern:*

Be it known that I, SIDNEY B. KAHNWEILER, a citizen of the United States, and a resident of the city of New York, borough of Manhattan, in the county and State of New York, have invented a new and Improved Animal Toy, of which the following is a full, clear, and exact description.

This invention relates to toys and particularly to an improved toy for cats and has for an object to provide a structure which will be entertaining for the cat and which will cause the cat to so perform as to amuse human beings.

Another object of the invention is to provide a toy for cats in the form of a stuffed mouse protected by a cage, the stuffing being of a material specially pleasing to the cat.

A still further object of the invention is to provide a toy in which a container of catnip is provided in a foraminous cage so formed as not to injure the cat as it tries to bite the same.

In the accompanying drawing—

Figure 1:
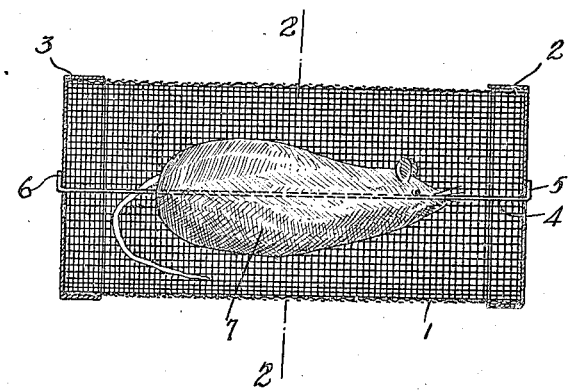
Figure 1 is a longitudinal vertical section through a toy disclosing one embodiment of the invention.
Figure 2:
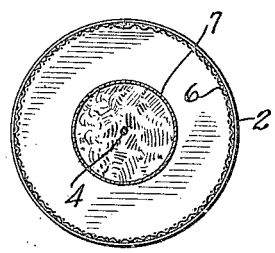
Figure 2 is a section through Figure 1 on line 2—2.

Referring to the accompanying drawing by numerals, 1 indicates a tubular casing formed of wire mesh. This casing may be woven as a seamless tube or may be made from flat wire mesh bent into the desired shape and the ends secured together. When this is done, the abutting ends are so secured together and protected as not to injure the cat as it plays with the device. The ends of the casing 1 are covered by cup-shaped metallic caps 2 and 3. These caps may be connected with the casing 1 by solder, by being pinched therein or in any desired manner as long as a sharp or roughened projection is not presented, as said projection would injure the cat.

In the drawing, however, a simple form of holding means is illustrated, namely, a small rod 4 is provided which extends through the end caps 2 and 3 and is bent over at 5 and 6. This rod also extends through a receptacle 7 filled with catnip. This receptacle is in the shape of a mouse and is given the appearance of a mouse by proper ornamentation, as for instance, by the addition of eyes and ears together with a tail. In this way, the receptacle 7 is attraced to the cat by sight and when near enough to touch the casing 1, the cat will smell the catnip and immediately make an effort to bit the mouse even through the container. The result will be that the cat will turn over and knock the container around with little idea of playfulness and also of getting at the receptacle 7. The device will act as a toy for both old and young cats and incidentally will be extremely pleasing to children by reason of the action of the cat.

What I claim is:—

1. A toy for cats comprising a foraminous casing, a receptacle containing catnip arranged in said casing, and means for holding said receptacle substantially centrally of the casing spaced from the walls thereof.

2. A toy for cats comprising a container filled with catnip and formed to give the appearance of a mouse, a wire mesh container for said receptacle, said container having sheet metal cup-shaped ends, and means for holding said ends in place and at the same time said receptacle substantially centrally of the container.

SIDNEY B. KAHNWEILER.